United States Patent [19]

Tanaka

[11] Patent Number: 4,757,383
[45] Date of Patent: Jul. 12, 1988

[54] METHOD OF IMAGE SIGNAL ENCODING BY ORTHOGONAL TRANSFORMATION

[75] Inventor: Nobuyuki Tanaka, Kanagawa, Japan

[73] Assignee: Fuji Photo Film Co., Ltd., Kanagawa, Japan

[21] Appl. No.: 39,884

[22] Filed: Apr. 20, 1987

[30] Foreign Application Priority Data

Apr. 18, 1986 [JP] Japan .................................. 61-90534

[51] Int. Cl.$^4$ .............................................. H04N 7/12
[52] U.S. Cl. ..................................... 358/133; 358/135
[58] Field of Search ............... 358/133, 135, 136, 105, 358/260; 375/122, 27; 382/43, 56; 364/826

[56] References Cited

U.S. PATENT DOCUMENTS

| | | | |
|---|---|---|---|
| 4,134,134 | 1/1979 | Lux | 358/133 X |
| 4,580,162 | 4/1986 | Mori | 358/135 |
| 4,656,500 | 4/1987 | Mori | 358/135 X |

Primary Examiner—Howard W. Britton
Assistant Examiner—Victor R. Kostak
Attorney, Agent, or Firm—Sughrue, Mion, Zinn, Macpeak, and Seas

[57] ABSTRACT

A method of image signal encoding by orthogonal transformation comprises the steps of carrying out orthogonal transformation of two-dimensional image signals on the basis of a predetermined orthogonal function, arranging transformed signals obtained by the orthogonal transformation in the order of sequency of the orthogonal function, and encoding the transformed signals respectively with an intrinsic code length. The transformed signals are classified into groups each of which is composed of the signals corresponding to approximately equal spatial frequencies. The code length is adjusted to a common value for each of the groups on the basis of values of the transformed signals in each of the groups.

6 Claims, 3 Drawing Sheets

FIG. 6
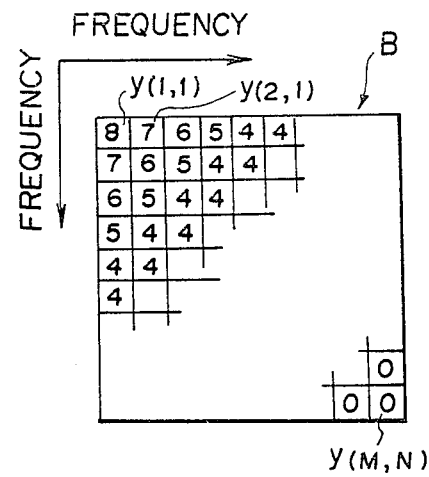
FIG. 7
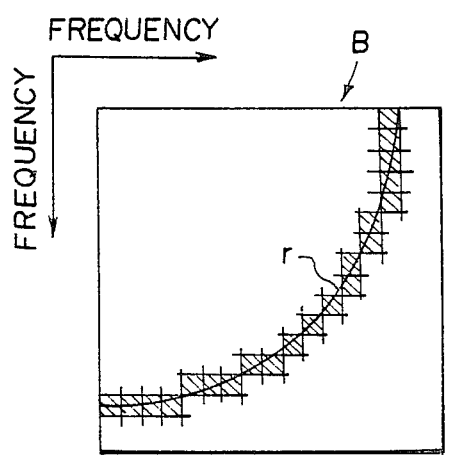
FIG. 8
| k: | 2 | 3 | 4 | 5 | 6 | ----- | (M+N) |
|---|---|---|---|---|---|---|---|
| Q: | 8 | 7 | 6 | 5 | 4 | 4 -- -- | 0 |

METHOD OF IMAGE SIGNAL ENCODING BY ORTHOGONAL TRANSFORMATION

BACKGROUND OF THE INVENTION

1. Field of the Invention

This invention relates to a method of encoding image signals for the purpose of signal compression. This invention particularly relates to a method of encoding image signals by orthogonal transformation.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

As one of the methods of image signal compression, a method utilizing orthogonal transformation of image signals is well known. In this method, digital two-dimensional image signals are divided into blocks comprising an appropriate number of samples, and orthogonal transformation of a value string comprising the sample values is conducted for each block. Since energy is concentrated at a specific component by the orthogonal transformation, a component of high energy level is encoded (quantized) by allocating a long code length thereto, and a component of low energy level is encoded coarsely with a short code length, thereby reducing the number of codes per block. As the orthogonal transformation, Fourier transformation, cosine transformation, Hadamard transformation, Karhunen-Loève transformation, or Harr transformation is usually used. The aforesaid image signal compression method will hereinbelow be described in further detail by taking the Hadamard transformation as an example. As shown in FIG. 2, blocks are formed by dividing digital two-dimensional image signals in a unit of, for example, two signals in a predetermined one-dimensional direction. When sample values $x(0)$ and $x(1)$ in the block are plotted on an orthogonal coordinate system, since correlation therebetween is high as mentioned above, most of the sample values are distributed near the straight line represented by the formula $x(1)=x(0)$ as shown in FIG. 3. Therefore, as shown in FIG. 3, the orthogonal coordinate system is transformed by an angle of 45° to determine a new $y(0)-y(1)$ coordinate system. On the $y(0)-y(1)$ coordinate system, $y(0)$ represents the low frequency component of the original image signals prior to transformation, and attains a value slightly larger than $x(0)$ and $x(1)$ [a value approximately $\sqrt{2}$ times the values of $x(0)$ and $x(1)$]. On the other hand, values of $y(1)$ representing the high frequency component of the original image signals are distributed just within a very narrow range near the $y(0)$ axis. In the case where a code length of, for example, seven bits is required for encoding of $x(0)$ and $x(1)$, seven bits or eight bits are required for encoding of $y(0)$. On the other hand, $y(1)$ can be encoded with a code length of, for example, four bits. Consequently, the code length per block is shortened, and compression of the image signals is achieved.

Orthogonal transformation of second order wherein each block is constituted by two image signals is conducted as mentioned above. As the other is increased, the tendency of energy concentrating at a specific component is increased, and it becomes possible to improve the effect of decreasing the number of bits. In general, the aforesaid transformation can be conducted by use of an orthogonal function matrix. In an extreme case, when an intrinsic function of the objective image is selected as the orthogonal function matrix, the transformed image signals are constituted by the intrinsic value matrix, and the original image can be expressed just by the diagonal component of the matrix. Also, instead of dividing the image signals just in a single direction to form blocks as mentioned above, each block may be constituted by two-dimensional image signals. In this case, the effect of decreasing the number of bits is markedly improved over the one-dimensional orthogonal transformation.

The transformed signals obtained by the aforesaid two-dimensional orthogonal transformation are arranged in the order of the sequency (i.e. the number of "0" position crossing) of the orthogonal function utilized for the transformation in each block. Since the sequency is correlated with the spatial frequency, the transformed signals are put side by side in the longitudinal and transverse directions in the order of the frequency as shown in FIG. 4. Therefore, the code length per block may be shortened by allocating a comparatively long code length to the transformed signals representing the low frequency component (i.e. the signals on the left upper side in FIG. 4) as in the case where a longer code length is allocated to $y(0)$ in the aforesaid one-dimensional orthogonal transformation of second order, and allocating a comparatively short code length or no code to the transformed signals representing the high frequency component (i.e. the signals on the right lower side in FIG. 4).

The aforesaid allocation of the code lengths has heretofore been conducted in accordance with a predetermined pattern. However, since the code length necessary for representing the transformed signals of a sequency differs with images and blocks, it may occur that the predetermined and allocated code length is insufficient to represent the transformed signal accurately. In such a case, the maximum value or the minimum value which can be represented with the allocated code length is taken as the encoded signal. As a result, the image quality of a reproduced image obtained by decoding and inverse transformation is deteriorated. In order to eliminate this problem, the allocated code length determined in advance may be adjusted to a substantially long value. However, with this method, it is impossible to compress the image signals substantially.

SUMMARY OF THE INVENTION

The primary object of the present invention is to provide a method of image signal encoding by orthogonal transformation wherein the signal compression ratio is increased substantially.

Another object of the present invention is to provide a method of image signal encoding by orthogonal transformation, which minimizes deterioration in image quality of a reproduced image caused by insufficiency of code length.

The present invention provides a method of image signal encoding by orthogonal transformation wherein orthogonal transformation is conducted on two-dimensional image signals on the basis of a predetermined orthogonal function, and transformed signals obtained by the orthogonal transformation and put side by side in the order of sequency of said orthogonal function are respectively encoded with an intrinsic code length, wherein the improvement comprises the steps of:

(i) classifying said transformed signals into groups each of which is composed of the signals corresponding to approximately equal spatial frequencies, and (ii) adjusting said code length to a common value for each of said groups on the basis of values of the transformed signals in each of said groups.

With the method of image signal encoding by orthogonal transformation in accordance with the present invention, it is possible to adjust the code length for each transformed signal to an optimal length, which is not excessively long and not insufficient, in the course of encoding of the transformed signals. Therefore, it becomes possible to minimize the amount of the encoded signals and to markedly increase the signal compression ratio while preventing the image quality of the visible image reproduced by use of signals obtained by decoding and inverse transformation from being deteriorated by insufficiency of the code length.

BRIEF DESCRIPTION OF THE DRAWINGS

FIGS. 4, 5, 6, 7 and 8 are explanatory views showing the method of image signal encoding by orthogonal transformation in accordance with the present invention.

DESCRIPTION OF THE PREFERRED EMBODIMENTS

The present invention will hereinbelow be described in further detail with reference to the accompanying drawings.

Figure 1:
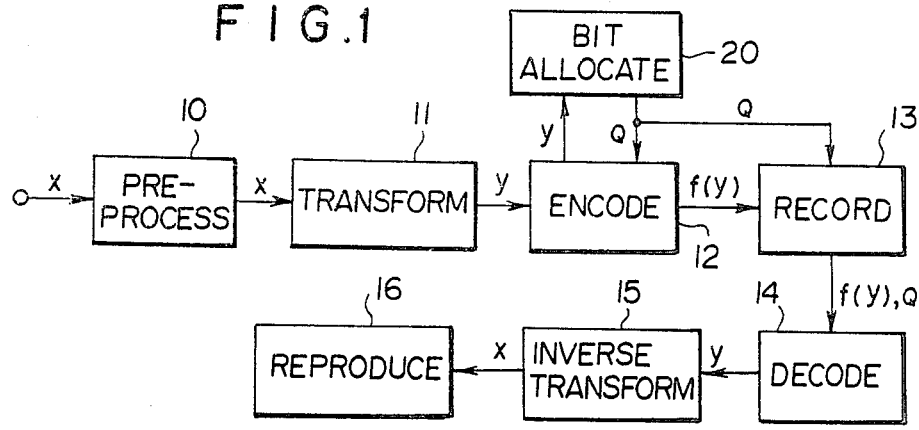
FIG. 1 is a block diagram showing the configuration of an apparatus for carrying out an embodiment of the method of image signal encoding by orthogonal transformation in accordance with the present invention.
Figure 2:
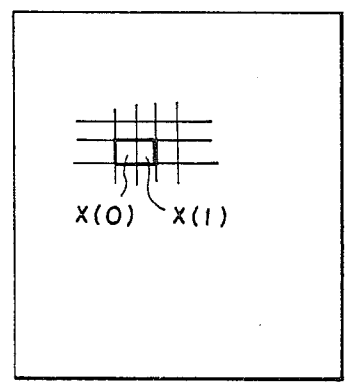
FIGS. 2 and 3 are explanatory views showing the orthogonal transformation in accordance with the present invention.
Figure 3:
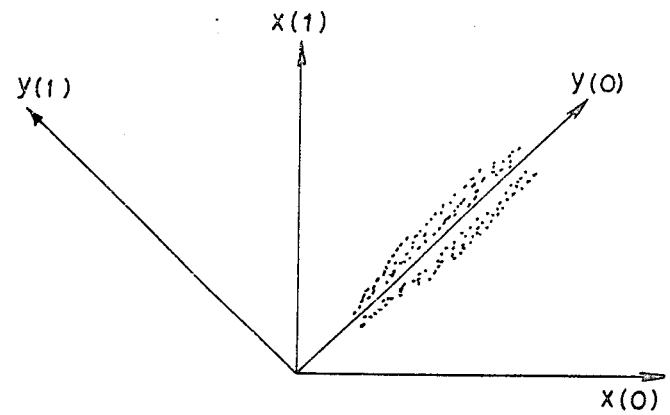
Figure 5:
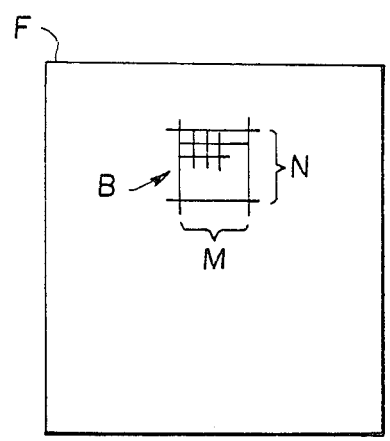

Referring to FIG. 1 schematically showing an apparatus for carrying out an embodiment of the method of image signal encoding by orthogonal transformation in accordance with the present invention, image signals (original image signals) x representing a half tone image are first sent to a pre-processing circuit 10 and subjected therein to pre-processing for improvement of the data compression efficiency, for example, smoothing for noise removal. The pre-processed image signals x are sent to an orthogonal transformation circuit 11 and subjected therein to two-dimensional orthogonal transformation. For example, as shown in FIG. 5, the two-dimensional orthogonal transformation is conducted in a unit of a rectangular block B comprising MxN number of samples (picture elements) in a half tone image F represented by the image signals x. As the orthogonal transformation, Hadamard transformation may be used. Since the transformation matrix in Hadamard transformation is constituted just by +1 and -1, Hadamard transformation can be executed by use of a transformation circuit simpler than in the other orthogonal transformations. Also, as well known, two-dimensional orthogonal transformation can be reduced to one-dimensional orthogonal tranformation. Specifically, the two-dimensional orthogonal transformation is carried out by subjecting the image signals at the MxN number of picture elements in the two-dimensional block B to one-dimensional orthogonal transformation in the longitudinal direction, and then subjecting the MxN number of transformed signals thus obtained to one-dimensional orthogonal transformation in the transverse direction. The transformation in the longitudinal direction and the transformation in the transverse direction may be conducted in the reverse order.

Figure 4:
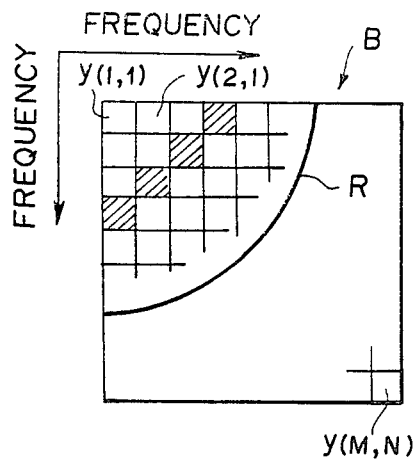

As shown in FIG. 4, transformed signals y obtained by the two-dimensional orthogonal transformation are put side by side in each block B in the longitudinal and transverse directions in the order of the sequency of the function on which the orthogonal transformation is based (for example, the Walsh function in the case of Hadamard transformation, or the trigonometrical function in the case of Fourier transformation). Since the sequency corresponds to the spatial frequency, the transformed signals y are arranged in the order of the spatial frequency, i.e. in the order of the density of the detail components of the image, in the longitudinal and transverse directions in the block B. In FIG. 4, a transformed signal y(1,1) at the left end column on the top line corresponds to sequency 0 (zero). As well known, the transformed signal y(1,1) represents the average image density in the block B.

The transformed signals y arranged in the order of the sequency of the function on which the two-dimensional orthogonal transformation is based are sent to an encoding circuit 12 as shown in FIG. 1. The encoding circuit 12 encodes each of the transformed signals y in the block B with a code length (i.e. a number of bits) in accordance with a bit allocation table created as described later. In the bit allocation table, an intrinsic number of bits is allocated for each sequency, for example, as shown in FIG. 6. Since energy is concentrated at the low frequency component in the transformed signals y as mentioned above, it is possible to decrease the number of bits required per block B and to achieve image signal compression by allocating a comparatively long code length to the low frequency component with high energy, and allocating a comparatively short code length to the high frequency component with low energy.

As mentioned above, the image quality of the reproduced visible image is deteriorated when the number of bits allocated to each of the transformed signals y in the aforesaid bit allocation table is too small, and the signal compression effect cannot be obtained substantially when the number of the allocated bits is too large. The requirement of the embodiment of FIG. 1 for eliminating these problems will be described hereinbelow. A bit allocation determining section 20 connected to the encoding circuit 12 receives the transformed signals y arranged as mentioned above. The transformed signals y are respectively expressed as y(i,j) where (i,j) denotes the coordinates with respect to the sequency 0 in the transverse and longitudinal directions, i=1, 2, 3, ..., M, and j=1, 2, 3, ..., N. In this case, the transformed signals y(i,j) wherein i+j=k where k=2, 3, 4, ..., (M+N) are classified into groups for each value of k and extracted. An example of the transformed signals y classified into one group are indicated by hatching in FIG. 4. The group of the transformed signals y shown as an example in FIG. 4 is for the case where k=5 and is composed of y(4,1), y(3,2), y(2,3), and y(1,4). The bit allocation determining section 20 calculates the maximum value and the minimum value of the transformed signals y in each of the signal groups classified as mentioned above, and then calculates the minimum number of bits capable of expressing the maximum value or the minimum value, whichever has a larger absolute value. The number of bits thus calculated is taken as the allocated number of bits for the respective transformed signals of said group. The number of bits is determined for each of the transformed signal groups, and the bit allocation table as shown in FIG. 6 is obtained. As is well known, when the transformed signals y are arranged as shown in FIG. 4, the components of equal frequencies are positioned along a circular arc R having the center at the sequency 0. Therefore, the respective transformed signals y in said group correspond to approximately equal spatial frequencies, and the values of the transformed signals y in said group are not so different from each other. Accordingly, the minimum number of bits capable of expressing the maximum value or the minimum value of the transformed signals y in said group, whichever has a larger absolute value, becomes sufficient for expressing the other transformed signals y in said group, and is not unnecessarily large. As shown in FIG. 6, a null code length (i.e. a null bit) is allocated to the transformed signals y corresponding to very high spatial frequencies, i.e. spatial frequencies higher than a predetermined value, thereby to discard such transformed signals y. Such transformed signals y are not so important for reproduction of the original image. Therefore, it is possible to decrease the number of bits required per block B to a higher extent by encoding only the signals other than said transformed signals y corresponding to very high spatial frequencies, i.e. by carrying out zonal sampling.

As shown in FIG. 8, the bit allocation determined as mentioned above is sent as information Q on the bit allocation in conformity with the values of k to the encoding circuit 12, which encodes the transformed signals y in accordance with the bit allocation information Q. As shown in FIG. 1, the encoded image signals f(y) and the bit allocation information Q are recorded on a recording medium (image file) such as an optical disk or a magnetic disk in a recording and reproducing apparatus 13. Since the image signals f(y) have been markedly compressed as compared with the original image signals x, a large number of images can be recorded on the recording medium. When the image is to be reproduced, the image signals f(y) and the bit allocation information Q are read out from the recording medium, and used for decoding into the transformed signals y in a decoding circuit 14. The transformed signals y thus decoded are sent to an inverse transformation circuit 15 and transformed inversely to the aforesaid two-dimensional orthogonal transformation. The original image signals x are thus restored, and sent to an image reproducing apparatus 16 for use in reproduction of the image which the image signals x represent.

Since the allocated number of bits determined by the bit allocation determining section 20 as mentioned above is not too large nor too small for each of the transformed signals y, it is possible to maintain a high image quality of the reproduced visible image and to substantially improve the signal compression ratio.

In the aforesaid embodiment, the minimum number of bits capable of expressing the maximum value or the minimum value of the transformed signals y in each group, whichever has a larger absolute value, is determined as the number of bits for the respective transformed signals y in said group. However, for example, the minimum number of bits capable of expressing the mean value of the absolute values of the transformed signals y in each group, or the minimum number of bits capable of expressing a value $\alpha$ times the standard deviation of the transformed signals y in each group, where $\alpha$ denotes a constant, may be determined as the number of bits for the respective transformed signals y in said group. In this case, though the code length required per block B can generally be decreased to a higher extent, there may arises the problem that the transformed signals y markedly different from the mean value are clipped and encoded. For the transformed signals y which are clipped in the course of encoding, the code length may be extended by a predetermined length.

Also, grouping of the transformed signals y should preferably be carried out by extracting the transformed signals y along a circular arc having the center at the sequency 0 (zero). An example of such grouping is shown in FIG. 7. As in FIG. 4, the transformed signals y classified into one group are indicated by hatching. In this case, when the radius of a circular arc "r" is changed stepwise, all of the transformed signals y in the block B are classified into groups. Also, the spatial frequencies of the respective transformed signals y in each group become closer to each other. Therefore, the transformed signals y in each group attain values closer to each other, and the common number of bits determined as mentioned above becomes more appropriate for the respective transformed signals y in the group.

I claim:

1. A method of image signal encoding by orthogonal transformation whrein orthogonal transformation is conducted on two-dimensional image signals on the basis of a predetermined orthogonal function, and transformed signals obtained by the orthogonal transformation and put side by side in the order of sequency of said orthogonal function as respectively encoded with an intrinsic code length, wherein the improvement comprises the steps of:
(i) classifying said transformed signals into groups each of which is composed of the signals corresponding to approximately equal spatial frequencies, and
(ii) adjusting said code length to a common value for each of said groups on the basis of values of the transformed signals in each of said groups.

2. A method as defined in claim 1, wherein said step of adjusting said code length includes adjusting said code length to the minimum value capable of expressing the maximum value or the minimum value of the transformed signals in each of said groups, whichever has a larger absolute value.

3. A method as defined in claim 1, wherein said step of adjusting said code length includes adjusting said code length to the minimum value capable of expressing a mean value of absolute values of the transformed signals in each of said groups.

4. A method as defined in claim 1, wherein said step of adjusting said code length includes adjusting said code length to the minimum value capable of expressing a value of $\alpha$ times the standard deviation of the transformed signals in each of said groups, where $\alpha$ denotes a constant.

5. A method as defined in any of claims 1 to 4, further comprising the steps of: expressing the transformed signals disposed side by side in transverse and longitudinal direction in the order of sequency of said orthogonal function as y(i,j) where (i,j) denotes coordinates with respect to a sequency 0 in the transverse and longitudinal directions, i=1, 2, 3, . . . , and j=1, 2, 3, . . . , and classifying said transformed signals y(i,j) into said groups for each value of k wherein i+j=k where k=2, 3, 4, . . .

6. A method as defined in any of claims 1 to 4, wherein said step of classifying the transformed signals along circular arcs having centers at a sequency 0 and having radii r where r=r1, r2, r3, . . . , 0<r1<r2<. . . incluses classifying into said groups for each of values of r.

* * * * *